United States Patent
Fukushima et al.

(10) Patent No.: US 6,346,929 B1
(45) Date of Patent: Feb. 12, 2002

(54) DISPLAY APPARATUS WHICH DETECTS AN OBSERVER BODY PART MOTION IN CORRESPONDENCE TO A DISPLAYED ELEMENT USED TO INPUT OPERATION INSTRUCTIONS TO START A PROCESS

(75) Inventors: Nobuo Fukushima; Tomotaka Muramoto, both of Yokohama; Masayoshi Sekine, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/425,793

(22) Filed: Apr. 20, 1995

(30) Foreign Application Priority Data

Apr. 22, 1994 (JP) .............................................. 6-084578
Feb. 10, 1995 (JP) .............................................. 7-022787

(51) Int. Cl.$^7$ ................................................ G09G 5/00
(52) U.S. Cl. ............................... 345/8; 345/9; 345/156
(58) Field of Search ........................... 345/7, 8, 9, 156, 345/157, 158, 168, 326, 351, 355, 358, 419, 425, 473, 972, 632; 351/209, 210, 211, 158; 382/100, 103, 291; D16/309; 396/373

(56) References Cited

U.S. PATENT DOCUMENTS

| | | | |
|---|---|---|---|
| D287,021 S | * 12/1986 | Johnson | D16/309 |
| 4,988,981 A | * 1/1991 | Zimmerman et al. | 345/156 |
| 5,089,914 A | * 2/1992 | Prescott | 345/8 |
| 5,168,531 A | * 12/1992 | Sigel | 382/291 |
| 5,320,538 A | * 6/1994 | Baum | 345/8 |
| 5,381,158 A | * 1/1995 | Takahara et al. | 345/156 |
| 5,394,517 A | * 2/1995 | Kalawsky | 345/8 |
| 5,454,043 A | * 9/1995 | Freeman | 345/358 |
| 5,471,542 A | * 11/1995 | Ragland | 351/208 |
| 5,491,510 A | * 2/1996 | Gove | 348/77 |
| 5,515,079 A | * 5/1996 | Hauck | 345/157 |
| 5,534,917 A | * 7/1996 | MacDougall | 348/169 |
| 5,610,678 A | * 3/1997 | Tsuboi et al. | 396/373 |
| 5,644,324 A | * 7/1997 | Maguire, Jr. | 345/8 |
| 5,684,943 A | * 11/1997 | Abraham et al. | 345/473 |
| 5,694,142 A | * 12/1997 | Dumoulin et al. | 345/156 |
| 5,751,260 A | * 5/1998 | Nappi et al. | 345/8 |
| 5,767,842 A | * 6/1998 | Korth | 345/168 |
| 5,812,257 A | * 9/1998 | Teitel et al. | 345/8 |
| 5,917,490 A | * 6/1999 | Kuzunuki et al. | 345/351 |

FOREIGN PATENT DOCUMENTS

| | | |
|---|---|---|
| EP | 0 571 702 A2 | 12/1993 |
| WO | WO 93/14454 | 7/1993 |

OTHER PUBLICATIONS

"Im Handumdr"; 202 Funkschau 66 (1994), Jan., No. 3, pp. 82–87,Munchen, DE.

"Video See–through Design for Merging of Real and Virtual Environments", Edwards, E.K., et al., IEEE, 01/93, pp. 222–233.

"Patent Abstracts of Japan", vol. 14, No. 360, Aug. 3, 1990 (Abstract of JP2132510).

"Patent Abstracts of Japan", vol. 8, No. 259, Nov. 28, 1984 (Abstract of JP59132079).

* cited by examiner

Primary Examiner—Steven Saras
Assistant Examiner—Paul Bell
(74) Attorney, Agent, or Firm—Morgan & Finnegan, LLP

(57) ABSTRACT

A display apparatus comprises a displaying device for displaying video information for an observer, a detecting device for detecting a motion of at least a part of the body of the observer, and a controlling device for making the displaying device display a display element for input of an operation instruction, and starting a process corresponding to the display element when the detecting device detects a specified motion in correspondence to the display element.

17 Claims, 13 Drawing Sheets

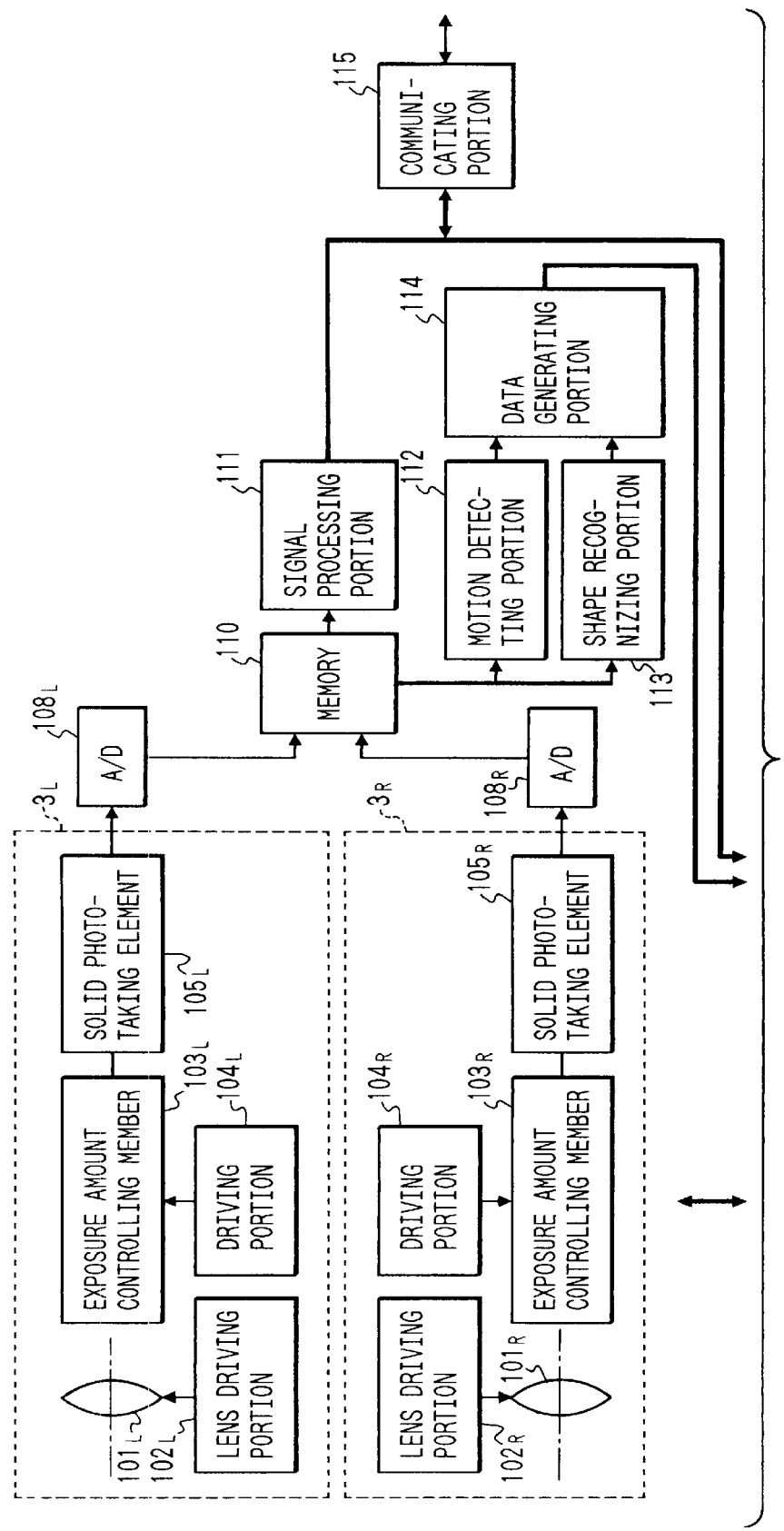

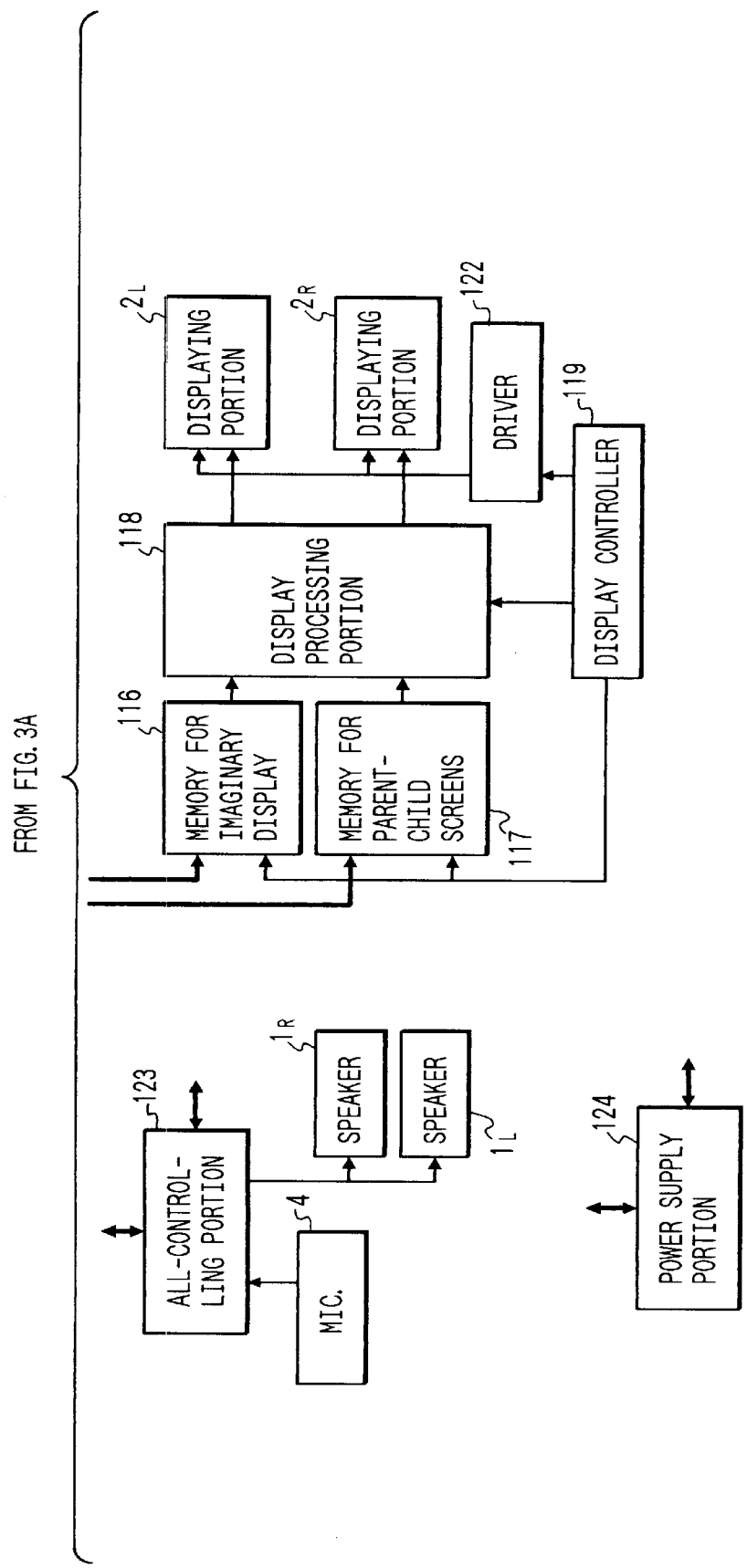

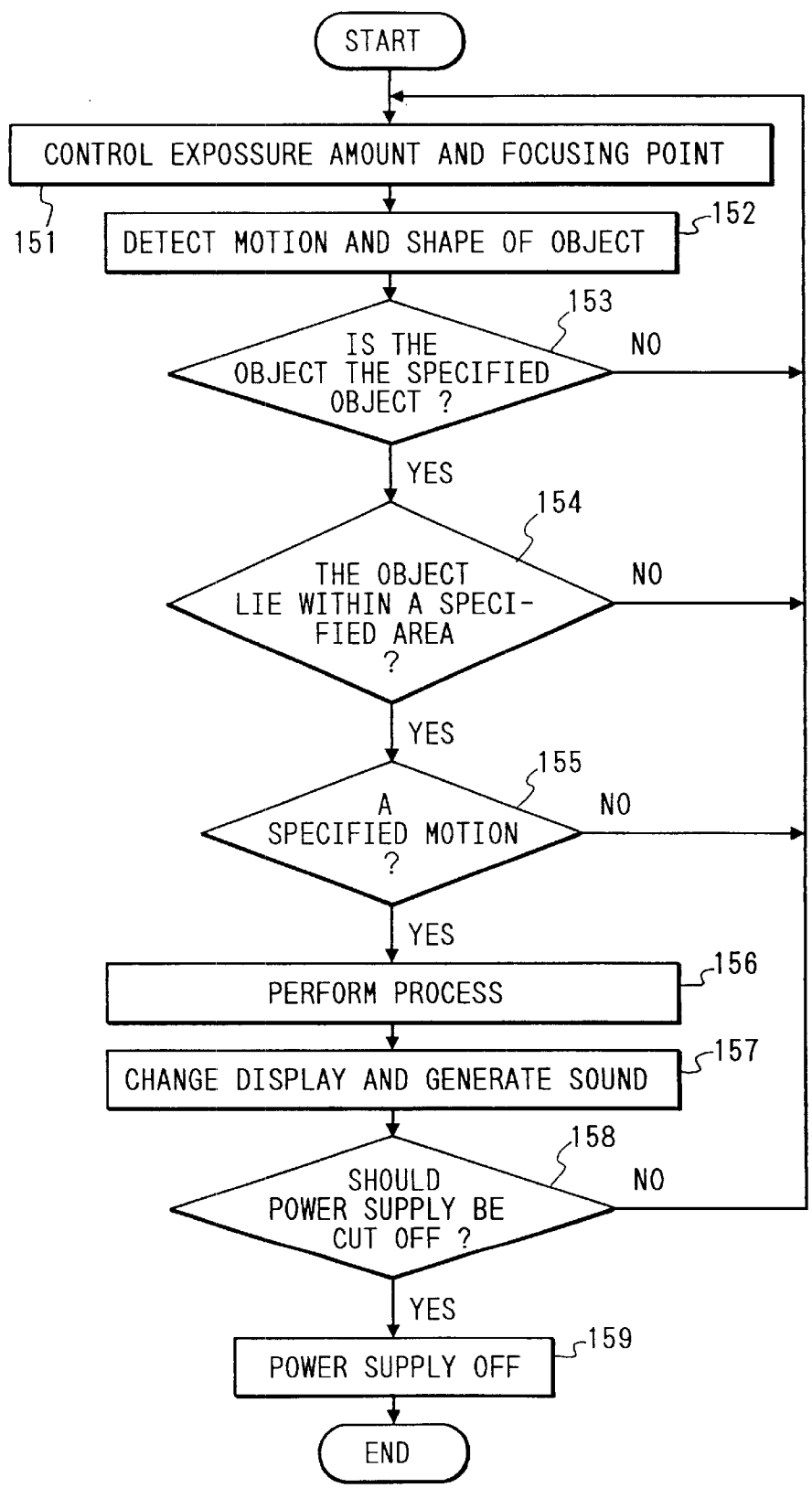

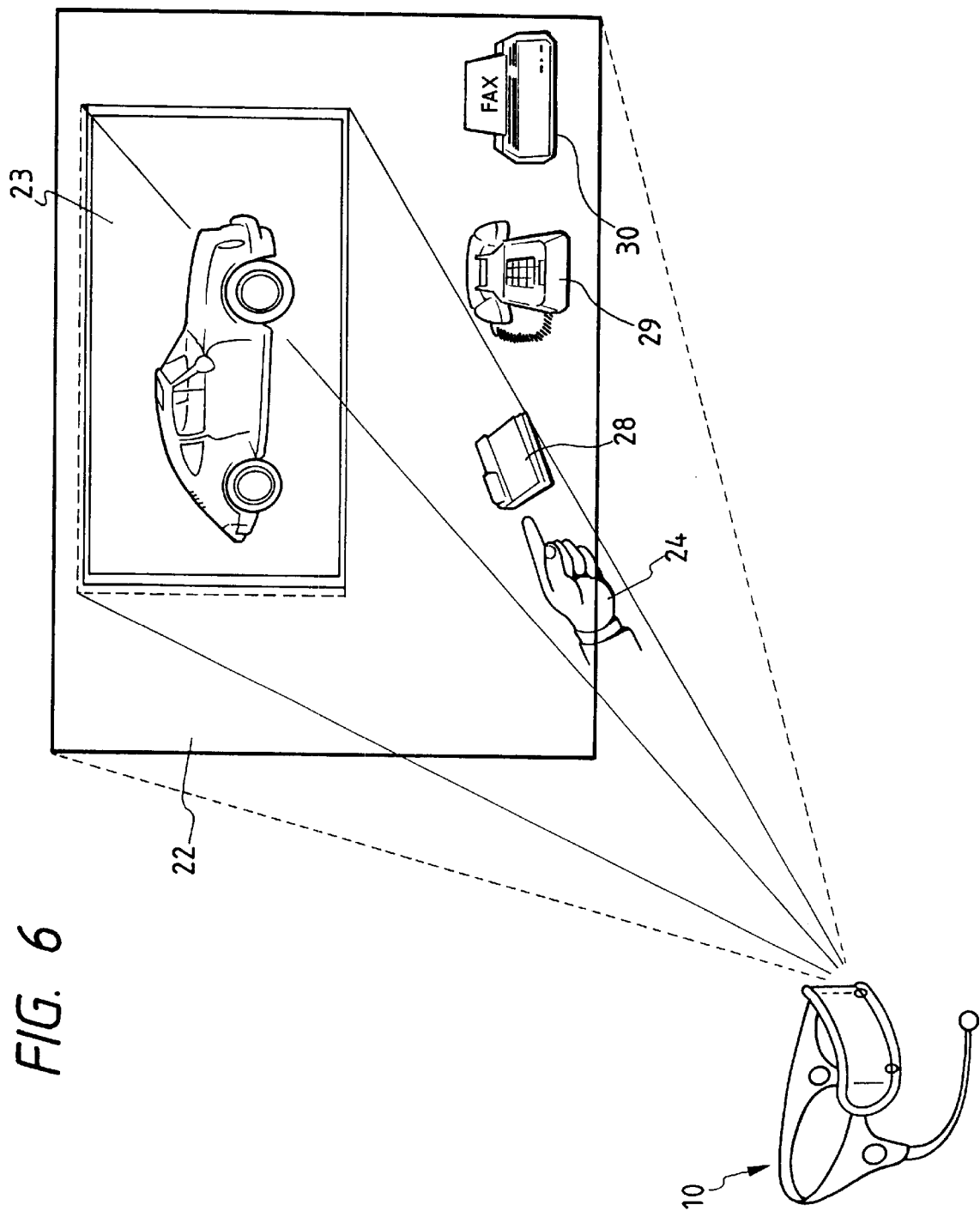

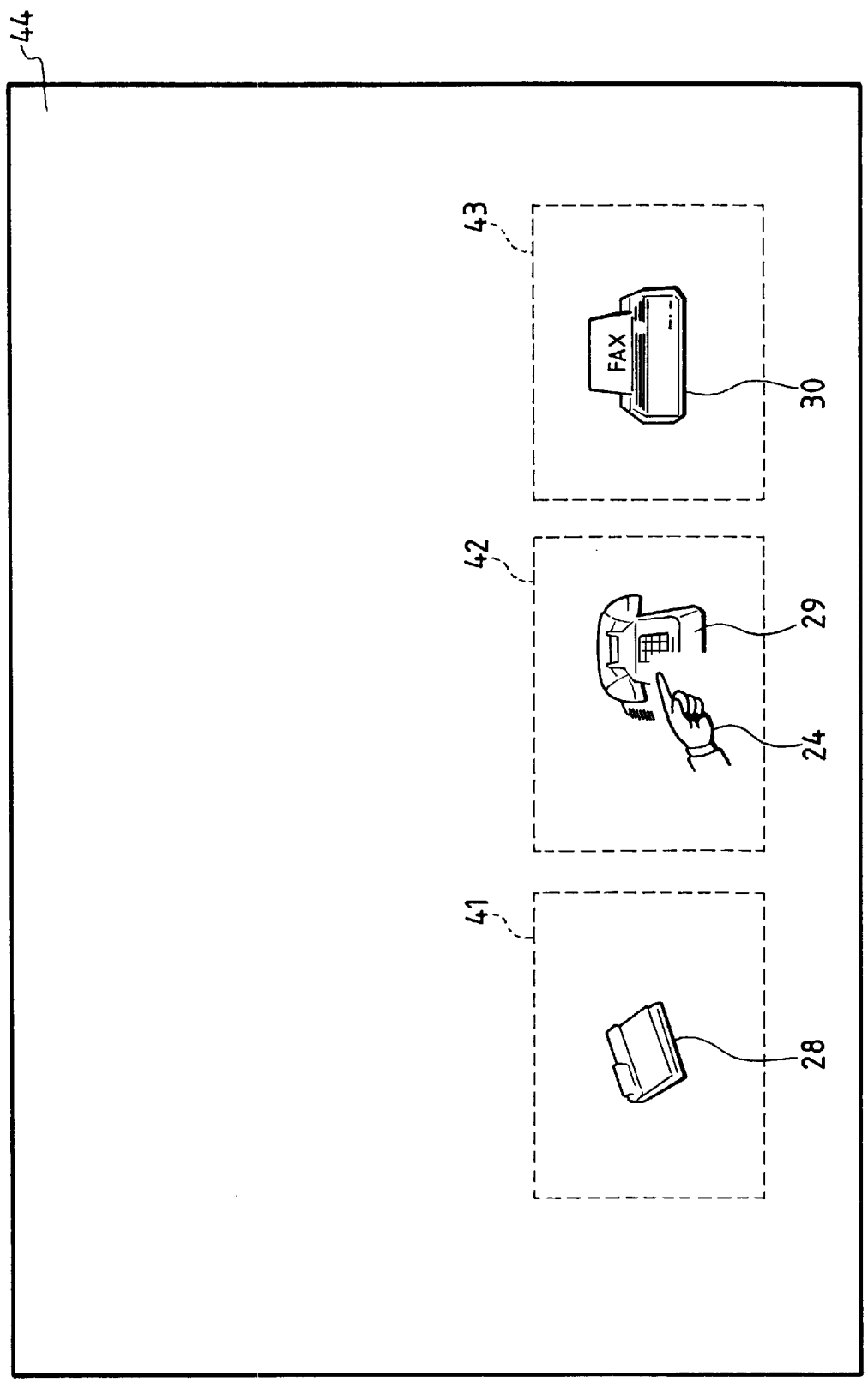

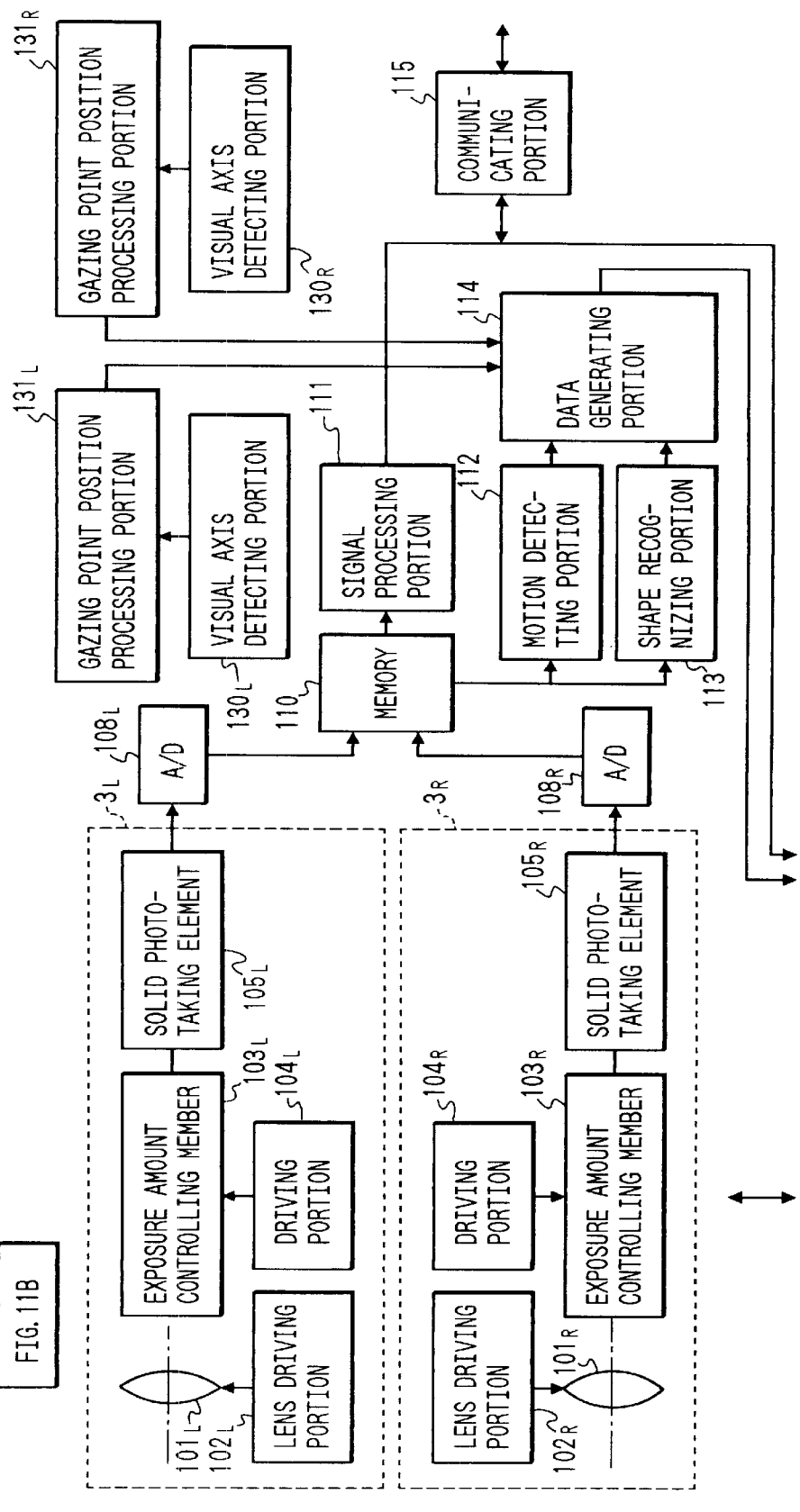

FROM FIG. 11A

DISPLAY APPARATUS WHICH DETECTS AN OBSERVER BODY PART MOTION IN CORRESPONDENCE TO A DISPLAYED ELEMENT USED TO INPUT OPERATION INSTRUCTIONS TO START A PROCESS

BACKGROUND OF THE INVENTION

1. Field of the Invention

The present invention relates to a picture recording/reproducing apparatus for displaying an image, and more particularly to a display apparatus having a display portion of a so-called HMD (Head Mounted Display) type to be mounted on the head.

2. Related Background Art

FIG. 1 is a perspective view to show a construction of a conventional HMD-type display apparatus. The HMD-type display apparatus is of a goggle type to be mounted on the head of a man, which is composed of speakers $91_L$, $91_R$ arranged in correspondence to the left and right ears of the user, a display portion 92 set in front of the user's eyes and consisting of a liquid crystal display member, camera portions $93_L$, $93_R$, arranged in correspondence to the both eyes of the user as being adjacent to the display portion 92, for taking in image information assumed to be seen through the user's eyes, and a microphone 94 for taking in voice or the like given by the user. Here, subscripts L, R indicate correspondence to the left (ear, eye) and the right (ear, eye). Further, the apparatus is provided with a control switch 98 (a so-called remote control switch) for the user to input an instruction, and the control switch 98 is connected to the main body portion of the HMD-type display apparatus through a wire cable 97 for transmitting a control signal etc. When the user performs a normal operation such as displaying a certain image on the display portion 92 or stopping the display, the user manipulates the control switch 98 held by hand.

However, in the case of such HMD-type display apparatus, because the user's eyes are covered by the display portion, the user cannot see the control switch and must grope to manipulate the control switch.

This sometimes caused the user to lose a sense of what the user is manipulating or to do an erroneous operation, which thus made the apparatus very difficult to handle. It is too difficult for the user to carry out a more complicated operation than the operation of "start," "end," or so through such a control switch.

SUMMARY OF THE INVENTION

An object of the present invention is to provide a display apparatus which is easy for an operator to give an instruction of operation and to which the operator can readily input even a complex operation instruction.

An aspect of the display apparatus of the present invention for achieving the above object is characterized by comprising:

displaying means for displaying video information for an observer;

detecting means for detecting a motion of at least a part of the body of the observer; and controlling means for making the displaying means display a display element for input of an operation instruction, and starting a process corresponding to the display element when the detecting means detects a specified motion in correspondence to the display element.

A preferred form of the display apparatus is characterized in that the display apparatus is mounted on the head of the observer.

A preferred form of the detecting means is characterized in that the detecting means has visual axis detecting means for detecting a visual axis of the observer.

A preferred form of the controlling means is characterized in that the controlling means has means for comparing a direction corresponding to the display element with a direction of the visual axis detected by the visual axis detecting means.

A preferred form of the controlling means is characterized in that the controlling means has means for displaying a display element moving in accordance with the motion detected by the detecting means, on the displaying means.

A preferred form of the controlling means is characterized in that the controlling means has means for changing a display property of the display element moving in accordance with the motion detected by the detecting means.

The display apparatus is characterized by further comprising sound generating means for generating a sound, wherein the controlling means makes the sound generating means function when the detecting means detects the specified motion.

A preferred form of the detecting means is characterized in that the detecting means comprises image taking means for taking in an image of at least a part of the body of the observer, and means for detecting a motion of the at least part of the body of the observer from an image signal from the image taking means.

A preferred form of the image taking means is characterized in that the image taking means has a plurality of image taking means with parallax.

A preferred form of the detecting means is characterized in that the detecting means has means for detecting a hand or a finger of the observer within a spatial range preliminarily determined.

The display apparatus is characterized by further comprising communicating means for transmitting a signal to a device installed outside the apparatus, wherein the controlling means makes the displaying means display a display element corresponding to the device, and transmits a predetermined signal through the communicating means to the device when the detecting means detects the specified motion in correspondence to the device.

A preferred form of the controlling means is characterized in that the controlling means comprises means for preliminarily storing features of an object, and means for comparing the image signal with the features stored.

The display apparatus of the present invention will be described in detail with some embodiments in the following description.

BRIEF DESCRIPTION OF THE DRAWINGS

FIG. 3 which comprised of FIGS. 3A and 3B is a block diagram to show the structure of the display apparatus of FIG. 2;

FIG. 4 is a flowchart to show the operation of the display apparatus of FIG. 2;

FIG. 6 is a drawing to illustrate a method of instruction operation;

FIG. 7 is a drawing to illustrate a method for recognizing an operation of an operator;

DESCRIPTION OF THE PREFERRED EMBODIMENTS

Next, the embodiments of the present invention will be described with reference to the accompanying drawings.

Embodiment 1

Figure 2:
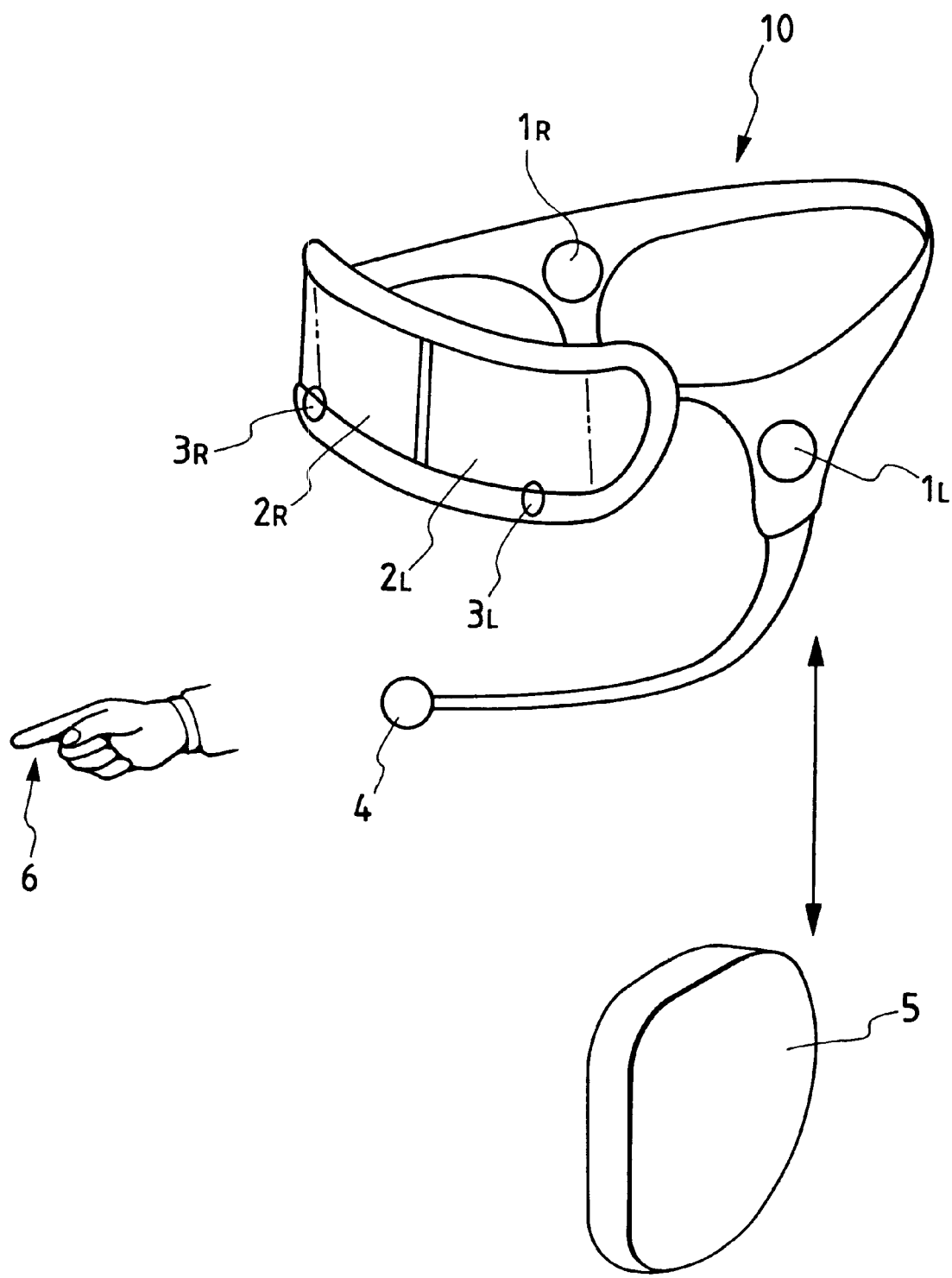
FIG. 2 is a perspective view to show the overall structure of the display apparatus as an embodiment of the present invention.

FIG. 2 is a perspective view to show the overall structure of the display apparatus as the first embodiment of the present invention, FIGS. 3A and 3B are block diagrams to show the structure of the display apparatus, and FIG. 4 a flowchart to show the operation of the display apparatus.

Figure 1:
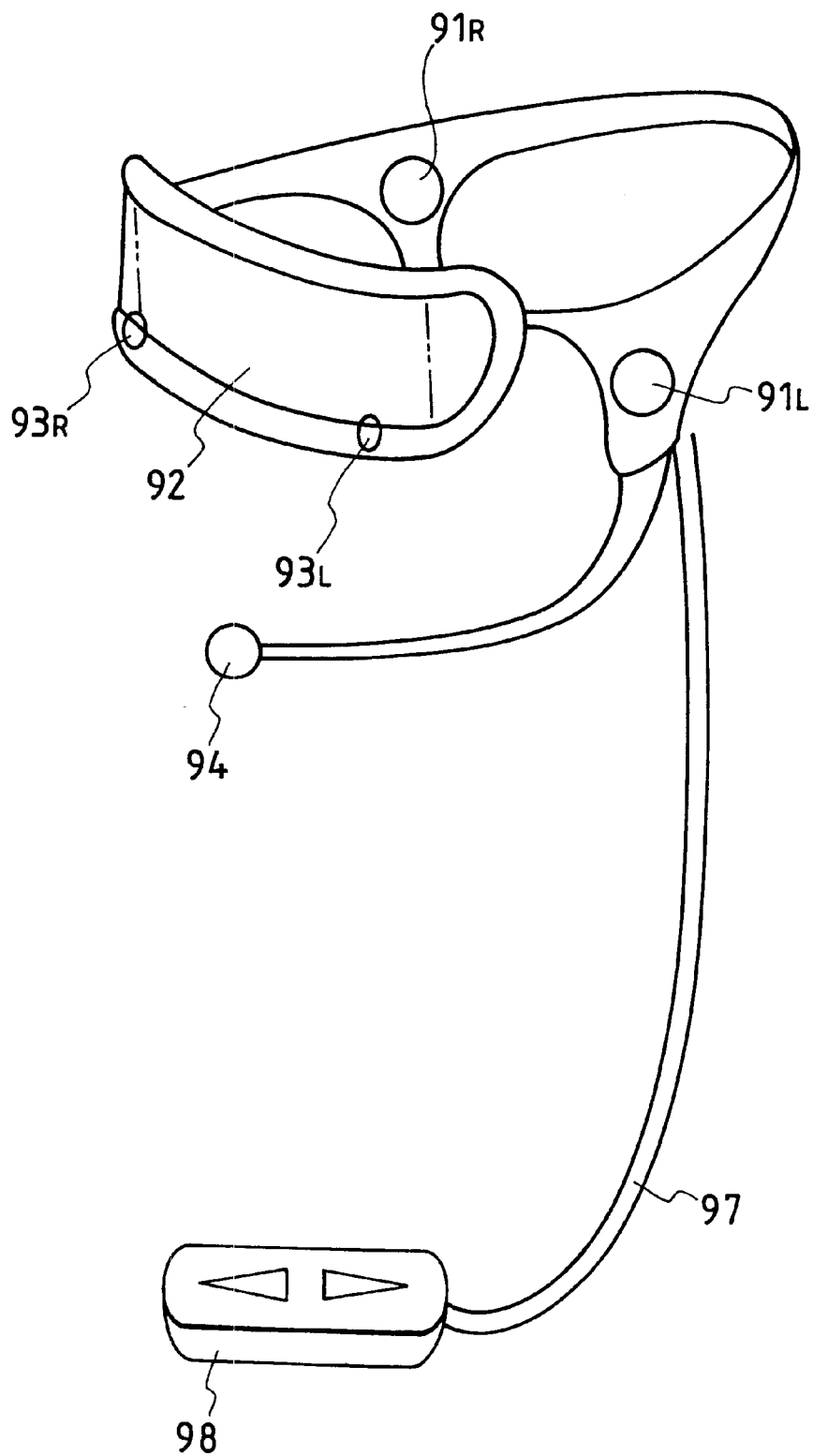
FIG. 1 is a perspective view to show the structure of the conventional HMD-type display apparatus.

This display apparatus is of the HMD (Head Mounted Display) type to be mounted on the head of an operator, which is constructed in a similar arrangement to the conventional apparatus shown in FIG. 1, but which is so arranged that an instruction from the operator is input by detecting a motion, for example, of the tip of a finger, thus obviating the control switch connected through the wire cable. This display apparatus is divided roughly into a mount portion 10 which is actually mounted on the head of the operator and a processing portion 5 provided separately from the mount portion 10. Although the processing portion 5 can be constructed as incorporated with the mount portion 10, it is preferred that the processing portion 5 be provided separately from the mount portion 10 in order to decrease the weight of the portion mounted on the head of the operator. Typically, the processing portion 5 is set on a belt portion around the waist of the operator. If the display apparatus of the present embodiment is used inside a room, the processing portion 5 may be installed anywhere in the room. In either case, signals etc. are transmitted through radio or cable between the mount portion 10 and the processing portion 5. A battery or the like is used as a power supply for the processing portion 5 and the mount portion 10. If the mount portion 10 and the processing portion 5 are connected to each other through a cable, the apparatus may be arranged to supply power from the processing portion 5 to the mount portion 10.

In the mount portion 10 of the goggle type there are provided speakers $1_L$, $1_R$ corresponding to the left and right ears of the operator, displaying portions $2_L$, $2_R$ located in front of the left and right eyes of the operator, for displaying images for the operator, camera portions $3_L$, $3_R$ for taking in a scene around the operator in accordance with the operator's eyes and detecting a part of the body of the operator, specifically a part of hand (e.g., finger tip 6), and a microphone 4 for taking in voice given by the operator. Here, the displaying portions $2_L$, $2_R$ are constructed as capable of displaying a stereoscopic image for the operator and each consists, for example, of a liquid crystal display member. Also, each camera portion $3_L$, $3_R$ is set in correspondence to the left or right eye, respectively, of the operator in the vicinity of each displaying portion $2_L$, $2_R$ in order to take in information of an image which would be seen through the operator's eyes. The two camera portions $3_L$, $3_R$ constitute a multi-eye image taking system. Here, the subscripts L, R indicate correspondence to the left (ear, eye) and the right (ear, eye), respectively.

The display apparatus of the present embodiment is arranged in such a manner that the camera portions $3_L$, $3_R$ detect, for example, a motion or a shape of finger tip 6 of the operator and that the entire main body is controlled in accordance with the motion or the shape thus detected or that communication is made with an external device to operate the external device.

Next, the detailed block structure of the display apparatus is described referring to FIGS. 3A and 3B.

Each camera portion $3_L$, $3_R$ is composed of a lens $101_L$, $101_R$, a lens driving portion $102_L$, $102_R$ for driving the lens $101_L$, $101_R$ to change the focal point or the zoom ratio of lens $101_L$, $101_R$, an exposure amount controlling member $103_L$, $103_R$ for adjusting an amount of exposure, e.g., aperture or shutter speed, a driving portion $104_L$, $104_R$ for drive-controlling the exposure amount controlling member $103_L$, $103_R$, and a solid state imaging device $105_L$, $105_R$ placed at a position where a light image from lens $101_L$, $101_R$ is focused after having passed the exposure amount controlling member $103_L$, $103_R$ and composed of a CCD sensor, for converting the light image into an electric signal.

Provided on the output side of each camera portion $3_L$, $3_R$ is an A/D converter $108_L$, $108_R$ for converting a left or right video signal output from the solid state imaging device $105_L$, $105_R$ into a digital signal. The digital data from the A/D converters $108_L$, $108_R$ is arranged to be stored in a memory 110. On the output side of memory 110 there are a signal processing portion 111 for effecting luminance signal processing and color signal processing, gamma correction processing, etc. on the video data to convert the video data into data suitable for communication or into data suitable for display on a monitor, a motion detecting portion 112 for detecting a motion of a part or the whole of a photographic screen, and a shape recognizing portion 113 for recognizing a shape or the like of a photographed object. An output from the signal processing portion 111 is put into a communicating portion 115 for communication with external devices and also into a memory 116 for virtual display as detailed later. An output from the motion detecting portion 112 and an output from the shape recognizing portion 113 are input into a data generating portion 114. The data generating portion 114, which is for displaying a virtual indication on the displaying portion $2_L$, $2_R$, generates model data for displaying a virtual finger or cursor and a virtual control panel, based on the information about the motion of the photographed finger tip. Here, the virtual indication means to display on the displaying portion $2_L$, $2_R$ a display object that is not really present or that is present but does not exist at a certain place in a three-dimensional space, as if it is actually present at the place. An output from the data generating portion 114 is input into a memory 117 for indication on parent-child screens as described below.

The display apparatus of the present embodiment is arranged to display a parent screen and a child screen superimposed inside the parent screen on the displaying portions $2_L$, $2_R$. The parent screen shows a surrounding scene around the operator as taken by the cameras $3_L$, $3_R$. On the other hand, the child screen is a screen for the display apparatus to indicate, independently of the surrounding scene, information of a preliminarily photographed image or the like, which may be a moving picture or a still picture. For displaying such parent screen and child screen and for performing the above-described virtual display, the display apparatus is provided with the imaginary display memory 116 for displaying a virtual indication, i.e., a virtual finger or cursor, or a virtual control panel, and the parent-child screen display memory 117 for temporarily storing image data to be displayed on the parent screen and the child screen. Further, there is provided a display processing portion 118 into which image data stored in the virtual display memory 116 and parent-child image display memory 117 is input, by which images for the parent screen, the child screen, and the virtual display screen are combined, and by which an image is separated with necessity into images for the left and right displaying portions $2_L$, $2_R$. The display processing portion 118 outputs signals in a predetermined signal form for display (NTSC, RGB, etc.). Further, the apparatus is provided with a display controller 119 for controlling display timing, and a timing signal from the display controller is supplied to the virtual display memory 116, the parent-child screen display memory 117, the display processing portion 118, and a driver 122. The driver 122 is for driving the left and right displaying portions $2_L$, $2_R$. Driven by the driver 122, the left and right displaying portions $2_L$, $2_R$ display the left and right screens, respectively, in accordance with image signals from the display processing portion 118.

For integrally controlling the above-described portions, a whole controlling portion 123 is provided in the processing portion 5 (FIG. 2). The whole controlling portion 123 also executes an image taking control such as lens drive, display control, and processing according to each application. Further, the microphone 4 and the speakers $1_L$, $1_R$ provided in the mount portion 10 are also connected to the whole controlling portion 123. The apparatus is further provided with a power supply 124 for supplying the power to the entire apparatus. The power supply 124 is constructed specifically of a battery. Next, the operation of the display apparatus is described referring to FIG. 4.

First, the exposure amount control and focal point control are executed (step 151). The exposure amount control is made by conducting such a feedback control that the imaging devices $105_L$, $105_R$ take in images while driving the exposure amount controlling members $103_L$, $103_R$, the images are converted into digital values by the A/D converters $108_L$, $108_R$, the digital values are temporarily stored in the memory 110, and the exposure amount controlling members $103_L$, $103_R$ are again driven so that a level of data in a predetermined range of screen (corresponding to a luminance level of subject) becomes a suitable level. Similarly, the focal point control is performed in such a manner that as to the data temporarily stored in the memory 110, data in a predetermined range of screen is let to pass a high-pass filter to measure a level of high-frequency components and the lenses $101_L$, $101_R$ are driven so as to make this level maximum. Subsequently, a motion and a shape of an object are recognized from the photographed screen by the motion detecting portion 112 and the shape recognizing portion 113 (step 152). There are a variety of methods for recognizing a motion or a shape, among which a simple example is a method (template matching) in which data of an image to be a reference is prepared and a correlation is obtained between the reference image data and an image to be recognized. The processes performed at these steps 151, 152 are well known as such processes as photometry, distance measurement, and camera shake correction in ordinary video cameras, and, therefore, detailed description thereof is omitted herein.

Next, it is determined whether the recognized object is a specified object, for example, a finger (step 153). If it is not the specified object, the flow returns to the above step 151 in order to await recognition of the specified object. If the recognized object is determined as the specific object, it is checked whether the specified object lies within a specified area in the space (step 154). A reason to check if it lies within the specified area is to determine if the operator moved a finger or the like into the specified area in order to give an instruction of operation. If the specified object is absent in the specified area, the flow returns to step 151 similarly as described above. If it is within the specified area, it is then determined if the specified object conducted a specified motion (step 155). The present embodiment is so arranged that an instruction from the operator is input through a motion of the operator, for example, which a pointing motion, a hand opening motion, or a hand closing motion is made for example by a finger or fingers. Here it is determined if either one of such specified motions was performed. If it is not one of the specified motions, the flow returns to step 151.

If the motion is determined as a specified motion at step 155, a process corresponding to the motion is next carried out (step 156). The process herein means execution of an application designated by the operator's motion (for example, calling or execution of a facsimile function). In response to the specified operation of the operator, the apparatus changes icons or the shape, size, or color of the virtual switch panel as displayed as a virtual indication, and if necessary, a sound is further output through the speakers $1_L$, $1_R$ (step 157). The change of the icons or the shape of the virtual switch panel is made by producing corresponding display data by the data generating portion 114. Also, a screen corresponding to the designated application is called out from the external device through the communicating portion 115 or from an unrepresented memory portion, is temporarily stored in the imaginary display memory 116 or the parent-child screen display memory 117, and is displayed on the left and right displaying portions $2_L$, $2_R$ through the display processing portion 118. Control of a display timing signal and reading out of the memory on this occasion is executed by the display controller 119.

Next, it is determined whether or not interruption of power supply should be made (step 158). For example, if no operation has been done over a predetermined time, the apparatus determines that the power supply should be interrupted. If the apparatus determines that the power supply should be maintained, the flow returns to step 151; if the power supply should be interrupted, the power supply is actually interrupted (step 159) and the overall operation is ended.

Figure 5:
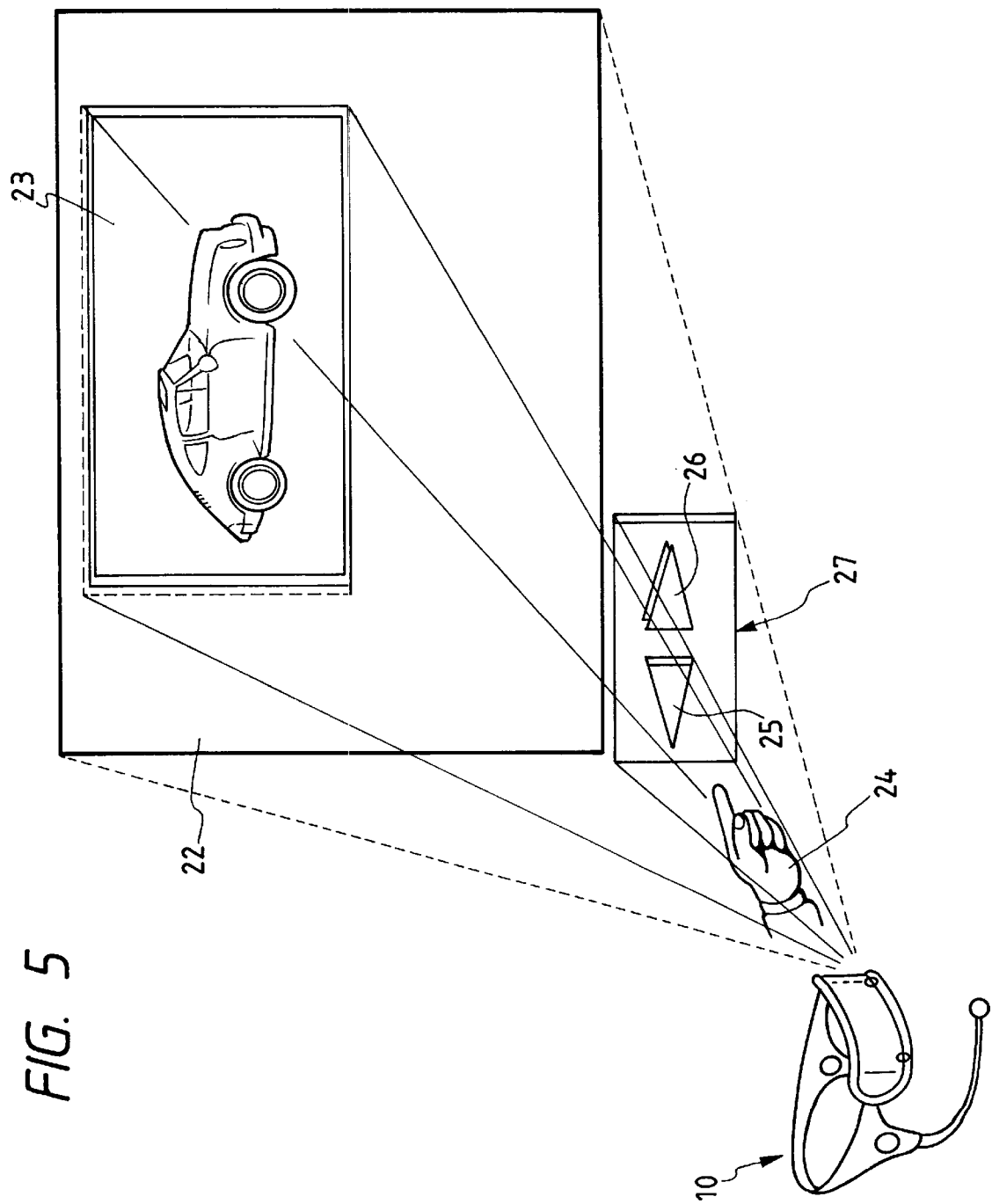
FIG. 5 is a drawing to illustrate an example of display screen.

Next described are display contents presented for the operator through the displaying portions $2_L$, $2_R$. First described referring to FIG. 5 is a case of performing the operation of the entire main body. Here, the displaying portions $2_L$, $2_R$ correspond to the left and right eyes of the operator, and a stereoscopic image display is made by these displaying portions $2_L$, $2_R$, but the description herein is given as regarding stereoscopically displayed images as a single image.

With the mount portion 10 mounted, a parent image 22 is displayed corresponding to nearly the whole of the field while a child image 23 smaller than the parent image is displayed in the parent image 22. Further, an operator's hand 24 detected in the above manner is also displayed as a virtual indication at a position apparently closer to the operator than the parent image 22. The hand 24 may be displayed as a virtual indication in a specific form of hand or in a shape of arrow or cursor. A control switch panel 27 is also displayed as a virtual indication similarly as the hand 24 of virtual indication. This control switch panel 27 is an example of display of control switches 25, 26 for frame return and frame feed of child screen display, and these control switches 25, 26 are also displayed as a virtual indication.

Here, the parent screen 22 shows a scene around the operator as taken in by the left and right camera portions $3_L$, $3_R$. The child screen 23 shows a preliminarily taken picture (a car herein). The picture on the child screen 23 may be a moving picture or a still picture, which may be read out of a memory device provided in the processing portion 5 or may be captured by communication from the outside through the communicating portion 115.

Here, let us consider a case that the operator intends to change the display contents on the child screen 23. Let us assume that a still image is displayed on the child screen 23 and an operator's finger is selected as the specified object in the above description. If the operator desires to display a next screen or if the operator wants to feed a frame, the operator first locates a finger thereof within the field of the camera portions $3_L$, $3_R$. Then the operator moves the finger to the position where the control switch panel 27 is displayed as a virtual indication (the position where it appears existing there), and performs an operation to push the control switch 26 with the finger. This pushing operation with the finger is taken by the camera portions $3_L$, $3_R$ and this operation is recognized according to the above-described processing, whereby, based on the control from the whole controlling portion 123, the next screen is read out and displayed on the child screen 23. Similarly, if the control switch 25 is pressed on a virtual basis, the child screen 23 is transferred to a screen one before. Namely, although the control switch panel 27 itself is not present in the actual space, by performing the pushing operation with the finger in the real space corresponding to the virtual display, a corresponding process is carried out based on the performance of the operation.

Here, the apparatus may be constructed in such an arrangement that if no operation is performed for a certain time period against the virtual control switch panel 27 then the display of the control switch panel 27 is turned off. Then, if the operator moves the finger to the specified position or performs a specified action, the apparatus may be arranged to detect it through the camera portions $3_L$, $3_R$ and again to display the virtual control switch panel 27.

Next described referring to FIG. 6 is a case to control devices set outside the display apparatus. In this example, facsimile and telephone are assumed as the external devices and a memo pad is further provided on a virtual basis.

The displaying portions $2_L$, $2_R$ show virtual indications of icon 28 indicating the memo pad, icon 29 indicating telephone, and icon 30 indicating facsimile. Here, the icons can be considered as equivalent to pictorial symbols used in graphical user interface (GUI) for personal computers etc. Also, display contents on the parent screen 22 and on the child screen 23 are assumed to be the same as those shown in FIG. 5.

Let us consider here a case that the operator wants data transfer through facsimile. Then the operator points out the icon 30 of facsimile out of the icons 28 to 30, and clicks it (an action to press it). This click action is detected, so that a virtual switch panel (not shown) for facsimile transmission is displayed on a virtual basis. Thus, the operator can manipulate virtual switches in accordance with instructions on the panel. In this case, the apparatus may be constructed in such an arrangement that once it is detected that the icon is clicked, the operator is informed of reception of the operation by changing the shape, size, or color of the icon (confirmation display of reception of the icon operation) or generating a sound through the speakers $1_L$, $1_R$.

After completion of the operation for facsimile transmission, the icon 30 of facsimile and the other icons may be erased from on the screen or may be moved to a location where they do not hinder the field, for example to a corner of the screen. Alternatively, the size of the icons may be decreased. The apparatus may be arranged so that the icons or the virtual switch panel is again displayed when the operator moves the finger to a specified position or performs a specified action and the camera portions $3_L$, $3_R$ detect it.

The above description concerned the example of facsimile transmission, but the same is applicable to the case of making a phone call. Briefly describing, when the operator performs an action of clicking the virtual icon 29 of telephone, the whole controlling portion 123 calls a task to process a telephone function outside or inside the display apparatus and links the microphone 4 and speakers $1_R$, $1_L$ with the telephone function. This enables the operator to communicate by voice with a calling partner through the communicating portion 115 and through a telephone set separately from the display apparatus or a telephone of calling destination. The processing of reception confirmation indication of icon operation and display change of icons after end of communication is the same as in the example of facsimile as described above.

A case of the memo pad is briefly described. Similarly as in the examples of facsimile and telephone, when the virtual icon 28 of memo pad is clicked by finger, a virtual note for memorandum is displayed on the screen. When the operator takes an action of writing a picture or letters on the virtual note with finger, a motion of the finger is detected and the detected motion is processed by the whole processing portion 23 or an external device to be stored or to be subjected to character recognition. Namely, a function of pen input computer can be realized. In this case, a touch panel in the pen input computer is displayed on a virtual basis by the displaying portions $2_L$, $2_R$.

Figure 8A:
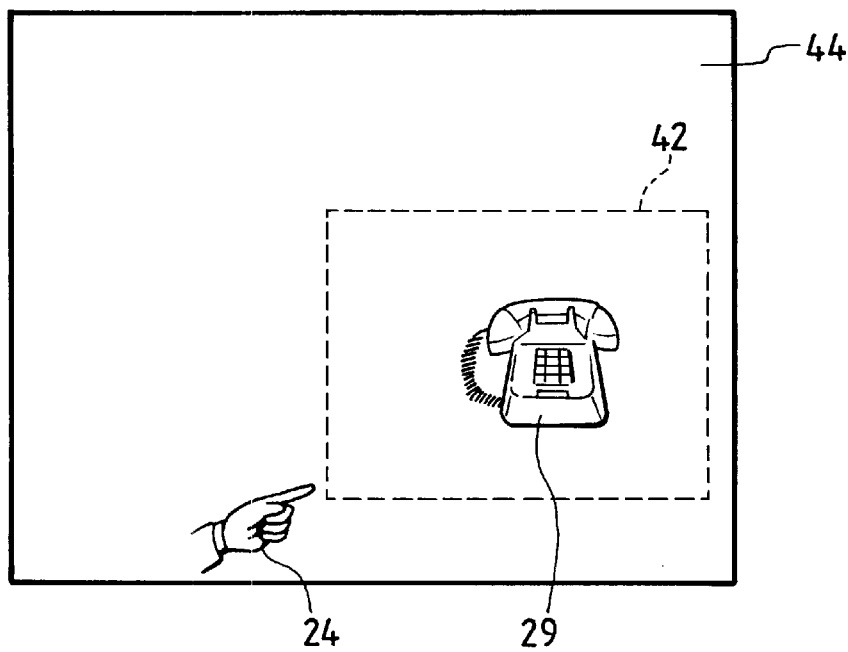
FIGS. 8A and 8B are drawings to illustrate a specific example of the method for recognizing an operation of an operator.
Figure 8B:
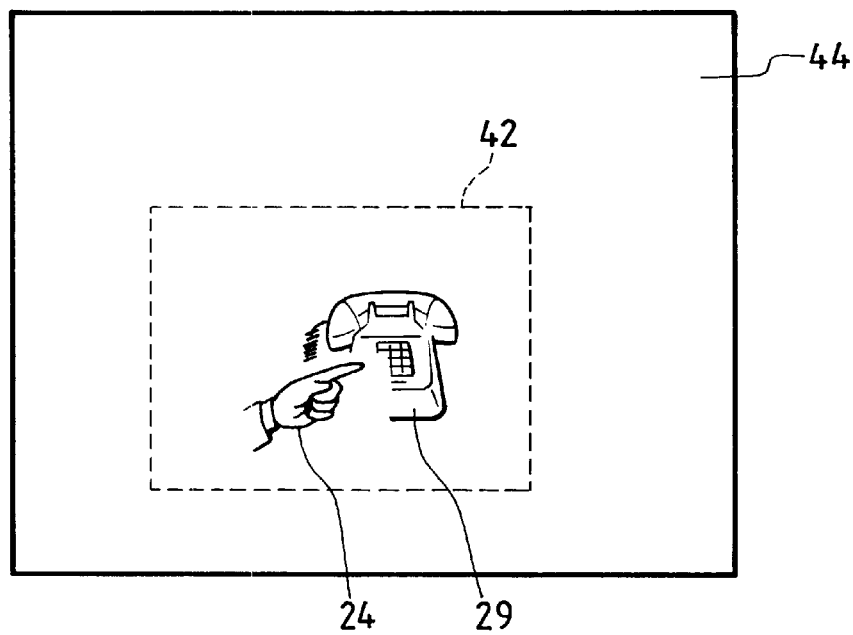

Next described referring to FIGS. 7, 8A, and 8B is how to detect an action against the virtually displayed icons or switch panel.

In FIG. 7, a display area 44 of the display apparatus is shown by the frame of solid line. Detection areas 41–43 are set for the respective icons 28–30 of memo pad, telephone, and facsimile, and the detection areas 41–43 are represented by the dashed lines.

When the camera portions $3_L$, $3_R$ detect a finger, it is checked where the finger lies within the display area 44. In the illustrated example, the finger lies in the detection area 42 of icon 29 of telephone, so that it is regarded that the operator pointed out the telephone. The judgment of whether the finger lies within the detection area 42 for icon 29 of telephone may be done by taking a correlation with some images, as shown in FIGS. 8A and 8B. FIG. 8A shows a case in which the finger is still outside the detection area 42, while FIG. 8B shows an image where the finger is located inside the detection area 42. Accordingly, the whole processing unit 123 may be arranged in such a manner that it preliminarily stores the image of FIG. 8A, continuously takes in images from the camera portions $3_L$, $3_R$, and detects any change from the image of FIG. 8A. In order to prevent erroneous recognition due to an object other than the finger entering the detection area 42, the processing portion may be arranged to preliminarily store the image with the finger therein as in FIG. 8B and to determine that the finger is in the detection area if a correlation with the image of FIG. 8B is more than a specific value.

Figure 9A:
FIGS. 9A, 9B, and 9C are drawings to illustrate a method for discriminating an operation instruction.
Figure 9B:
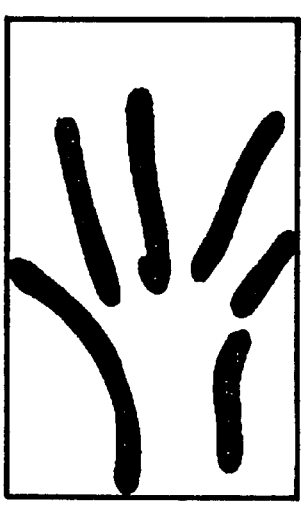
Figure 9C:

Next described referring to FIGS. 9A, 9B, and 9C is how to detect whether or not an action of pressing (or clicking) the virtually displayed icon with finger is taken. FIGS. 9A, 9B, and 9C are drawings to show results obtained by taking images of fingers of operator and extracting features such as contours from the images. Namely, FIG. 9A shows an action of pointing out with finger, FIG. 9B a state of an opening palm, and FIG. 9C a state of a holding hand.

The camera portions $3_L$, $3_R$ take images of the operator's fingers, and what form the fingers are taking is determined by obtaining correlations by reference to the images shown in FIGS. 9A to 9C. Of course, images other than the images shown in FIGS. 9A to 9C may be employed, or still more forms (reference images) may be prepared. Then it is determined that, for example, when the fingers in the form of FIG. 9A enter either frame of detection area 41–43, the outstanding icon is selected. Then, if the fingers change the form through the form of FIG. 9B into the form of FIG. 9C within a predetermined time, it is determined that execution of processing indicated by the outstanding icon is instructed; or, operation contents can be determined from a motion of fingers.

Figure 10A:
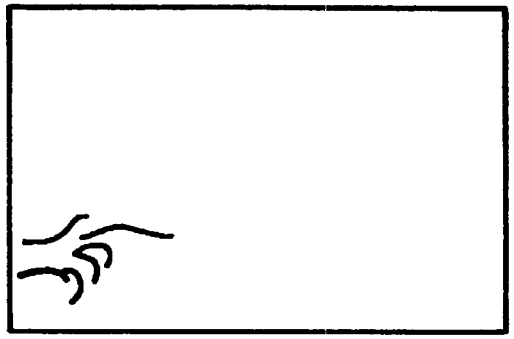
FIGS. 10A and 10B are drawings to illustrate a case for discriminating an operation instruction by detecting a motion of finger.
Figure 10B:
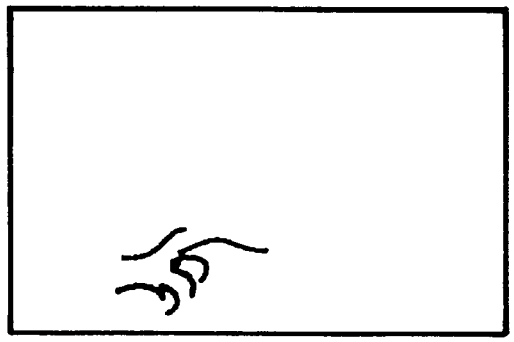

A method for detecting the finger motion is next described referring to FIGS. 10A and 10B.

Suppose FIG. 10A shows an image of fingers taken at a certain time and FIG. 10B an image of fingers taken after a lapse of a predetermined time therefrom. A motion and a speed of fingers can be obtained from these two images. Accordingly, if the fingers go at a speed over a predetermined speed into a frame of detection area 41–43, it can be determined that the outstanding icon is selected and execution is instructed thereby.

Incidentally, because in the present embodiment the camera portions $3_L$, $3_R$ are provided in the mount portion 10 of the HMD type display apparatus, they are mounted on the head of the operator after all. In this case, the operator's moving the head results in erroneously detecting the speed of fingers. It is thus desirable that the speed of fingers, which becomes a reference for determining instruction of icon and execution thereof, be set sufficiently higher than a moving speed of the head. Alternatively, because the camera portions $3_L$, $3_R$ are also taking a scene around the operator other than the fingers, the motion of fingers may be obtained by calculating a relative speed between the motion of image of the surrounding scene and the motion of fingers.

The methods for obtaining correlations between a plurality of images and for detecting a motion of an object in an image as described above are substantially the same as the camera shake detection and camera shake correction technology as employed in ordinary video cameras, which are readily understood by those skilled in the art, and therefore, more detailed description is omitted herein.

Embodiment 2

The display apparatus of the first embodiment as described above was so arranged that an instruction from the operator was input by detecting a motion of a part, for example the finger tip, of the operator's body, but the apparatus may be constructed in such an arrangement that in addition to the arrangement for detecting the motion of the finger tip etc. or instead of this arrangement, a means for detecting the visual axes of the observer is provided, whereby the instruction from the operator is input by detecting the visual axis of the observer. The following description concerns an embodiment in which an instruction from the operator is input by detecting the visual axes of the observer.

Figure 11B:
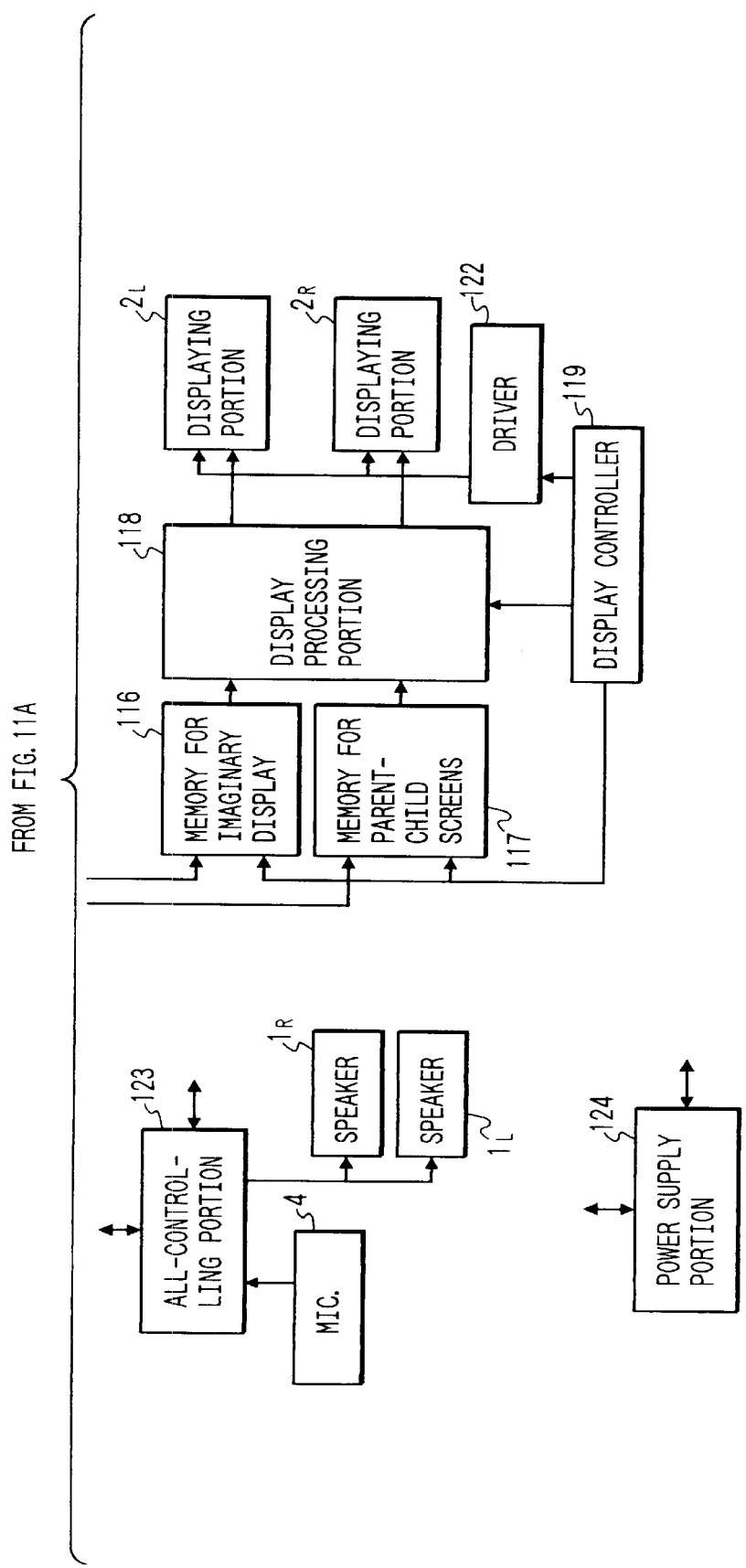
FIG. 11 which comprised of FIGS. 11A and 11B is a block diagram to show the structure of the display apparatus as a second embodiment of the present invention.

FIGS. 11A and 11B are block diagrams to show the structure of the display apparatus as a second embodiment of the present invention.

This display apparatus is characterized in that an instruction from the operator is attained by detecting the visual axes of the operator, and is constructed substantially in the same structure as the display apparatus of the first embodiment as described above except that visual axis detecting means therefor (visual axis detecting portions and gazing point position processing portions as detailed later) is provided. Since similar constituent portions to those in the display apparatus of the first embodiment have similar operations, they are denoted by same reference numerals in FIGS. 11A and 11B and description thereof is omitted herein.

The visual axis detecting means for detecting the visual axes of the observer is composed of visual axis detecting portions $130_L$, $130_R$ for detecting the visual axes of the left and right eyes, respectively, of the operator, and gazing point position processing portions $131_L$, $131_R$ for determining where the left and right eyes of the operator are gazing on the respective, virtual screens displayed on the displaying portions $2_L$, $2_R$, based on the visual axes of the left and right eyes detected by the visual axis detecting portions $130_L$, $130_R$, and generating a gazing point signal for indicating the gazing position as a gazing point over images on the displaying portions $2_L$, $2_R$.

Each gazing point signal generated by each gazing point position processing portion $131_L$, $131_R$ is input into the data generating portion 114. In addition to the processing for generating model data for displaying the virtual fingers or the virtual control panel, based on the information of a motion of photographed finger tips, the data generating portion 114 performs processing for generating model data for displaying a virtual gazing point, based on the gazing point signals input from the respective gazing point position processing portions $131_L$, $131_R$. Similar processing is carried out as in the case of the first embodiment as described above, based on the model data generated by the data generating portion 114, whereby the gazing point is displayed on the displaying portion $2_L$, $2_R$.

In the display apparatus of the present embodiment, selection of icon or control switch panel is made using the gazing point displayed on the displaying portion $2_L$, $2_R$. Namely, selection is made when the operator is gazing at one desired to execute out of the icons or switch panels displayed. In the display apparatus, execution of a selected icon or the like is done when the operator gazes at an icon for a predetermined time or when the operator takes a specified motion (for example, a motion of making a predetermined shape of fingers or hand being displayed together with the gazing point recognized; or also uses a mechanical switch).

Next described is a process for detecting a direction of the visual axis of the left or right eye of the operator.

Figure 12:
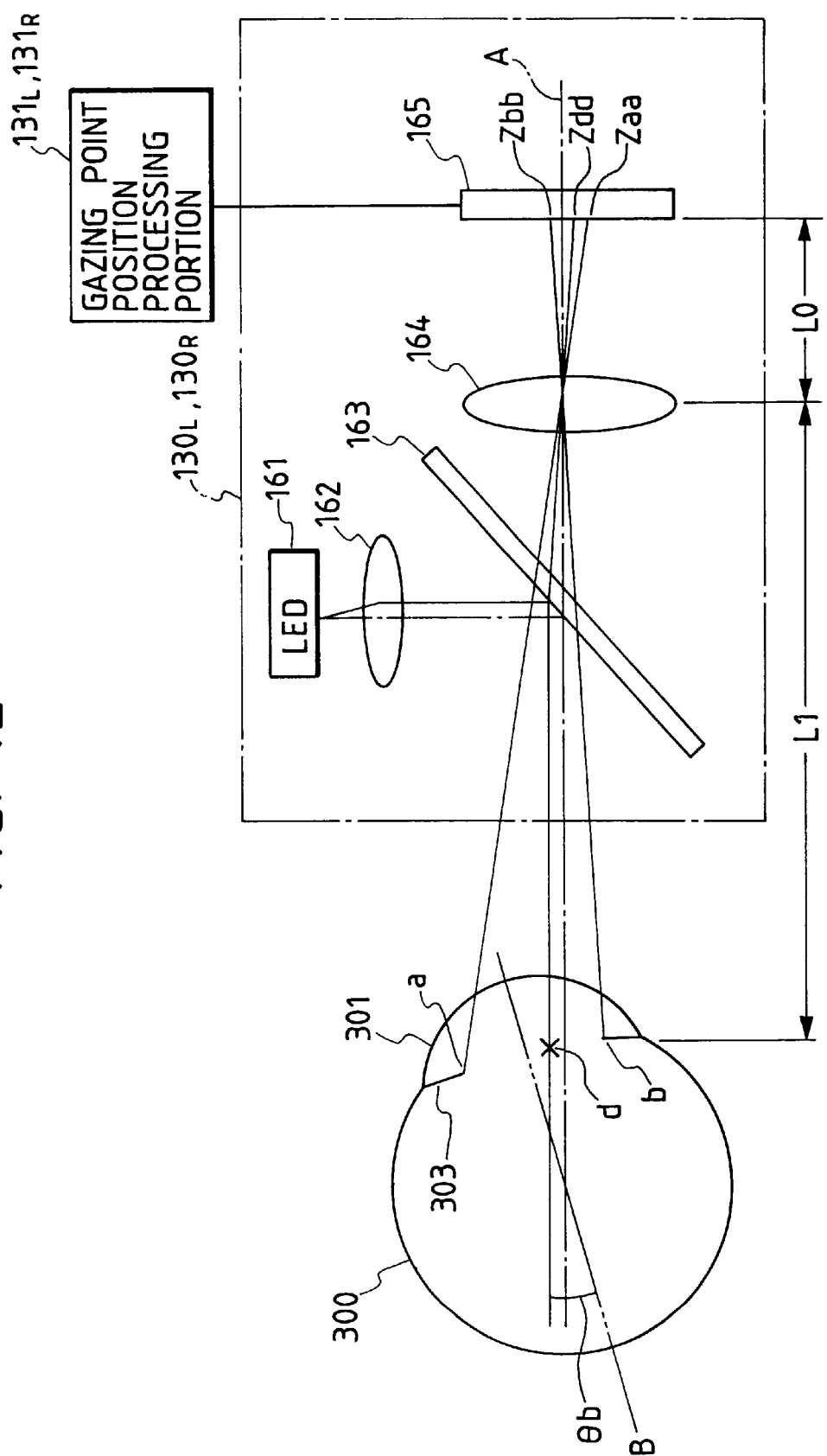
FIG. 12 is a drawing to illustrate the principle of a visual axis detection method.

FIG. 12 is a drawing for illustrating the principle of the visual axis detecting method. This visual axis detecting method is detailed in Japanese Laid-open Patent Application No. 5-68188. The visual axis detecting method as disclosed in the application is briefly described in the following.

In FIG. 12, reference numeral 300 designates an eyeball, 301 the cornea, and 303 the iris. The block surrounded by the chain line represents the visual axis detecting portion ( $130_L$, $130_R$) shown in FIGS. 11A and 11B. This visual axis detecting portion ( $130_L$, $130_R$) is composed of a light source 161 such as a light-emitting diode (LED) for emitting infrared light, a light-projecting lens 162 and a half mirror 163 arranged in order for guiding a light beam emitted from the light source 161 to the cornea 301, and a light-receiving lens 164 and a photoelectric device 165 such as CCD arranged in order along the traveling direction of the light beam reflected by the cornea 301 and passing through the half mirror 163. Then an output from the photoelectric device 165 forming the visual axis detecting portion ($130_L$, $130_R$) is input into the gazing point position processing portion ($131_L$, $131_R$).

The infrared light emitted from the light source 161 is converted into a parallel beam by the light-projecting lens 162, and the parallel beam is reflected by the half mirror 163 to illuminate the cornea 301 in the eyeball 300. Part of the infrared light illuminating the cornea 301 is reflected by the surface of the cornea 301. The reflected light from the surface of the cornea 301 passes through the half mirror 163 to be converged by the light-receiving lens 164 and then to be focused on the image plane of the photoelectric device 165. At this moment, a corneal reflection image d generated by part of the infrared light reflected by the surface of the cornea 301 is formed at position Zdd on the image plane of the photoelectric device 165, and reflection images a, b of the both edges of the iris 303 generated by part of infrared light reflected thereby are formed at positions Zaa and Zbb.

A rotational angle θb (visual axis direction) of the eyeball axis B of the eyeball 300 can be obtained from the position Zdd of the corneal reflection image d thus formed and the positions Zaa, Zbb of the reflection images a, b of the both edges of the iris 303 relative to the optical axis A on the image plane of the photoelectric device 165. Namely, in the gazing point position processing portion ($131_L$, $131_R$), the rotational angle θb of the eyeball axis B can be obtained by detecting a positional relation between the optical axis A and each position Zaa, Zbb, Zdd on the image plane thereof from outputs from the photoelectric device 165 and obtaining a magnification of the light-receiving lens 164 from a distance L1 between the reflective surface of the cornea 301 and the light-receiving lens 164 and a distance L0 between the light-receiving lens 164 and the image plane of the photoelectric device 165.

The operation of this display apparatus is briefly described in the following.

The mount portion 10 is first mounted. On this occasion, the images shown in FIG. 5 (the images of virtual indications of the operator's fingers and the control switch panel 27) are displayed on the displaying portion $2_L$, $2_R$, and a virtual indication of the gazing point is given on the thus displayed images and in the direction of the visual axis of the operator.

Now, when the operator is gazing at either one of the control switches 25, 26 for frame return and frame feed in the control switch panel 27 displayed on the displaying portions $2_L$, $2_R$, the gazing point displayed on the images moves in synchronization with movement of the operator's visual axes, and the gazing point is displayed at a gazing position on the control switch. Execution of processing related to the gazed control switch is recognized by continuing gazing for a predetermined time or by the operator's performing a specified motion, whereby, based on control from the whole controlling portion 123, the processing related to the control switch recognized as to be executed (frame return or frame feed of screen) is executed.

As described above, the display apparatus of the present embodiment enables input of instruction from the operator with the visual axes by replacing the position of the operator's fingers displayed as in the display apparatus of the first embodiment described previously, with the gazing point obtained from the visual axis direction of the operator.

Although the present embodiment was described as an example in which the position at which the operator was gazing was displayed as superimposed on the images on the displaying portion $2_L$, $2_R$, selection of a control switch etc. and execution thereof can be made by similar processing without displaying the gazing point.

Further, the present embodiment activates, with the visual axes, execution of the processing related to the control switch etc. by continuing gazing for a predetermined time, but the invention is by no means limited to it; for example, the execution can be activated, for example, when a specified motion of the visual axes of the operator is detected.

In the above-described display apparatus, the operability of apparatus can be further improved by providing the apparatus with an adjusting function for absorbing differences of visual axis detecting properties between individuals or providing the apparatus with a process to store data in a memory.

Other Embodiments

For the display apparatus of the present invention, a variety of embodiments can be considered other than the above-described embodiments. For example, though the camera portions were incorporated with the displaying portions of the HMD type main body in the above embodiments, the camera portions may be arranged as separate therefrom. In the case of the separate arrangement, for example, if the cameras are installed at a certain place in the room so as to take images of the whole of operator, there is an advantage that the whole motion of the body of the operator can be detected as well as the fingers. However, it becomes difficult to detect a fine motion of a finger or the like. Further, because the field of the cameras is not coincident with the operator's field, this arrangement is not suitable for applications requiring an indication of the operator's field on the displaying portions.

Also, the apparatus can be constructed in such an arrangement that the displaying portions are not mounted on the head of the operator. In this case, a monitor is set in the room like a normal television monitor and a camera takes in an instruction of the operator. In this arrangement, the operator can control channels of television or a video system, or can control a computer, in accordance with the taken instruction. Employed for the focusing operation of camera portions and the control of exposure amount are well known controls used in silver-salt cameras or video cameras.

The above-described embodiments were arranged with two camera portions for the left and right eyes, but the apparatus may be constructed using only one camera portion. In the case of the double-eye arrangement an advantage of obtaining stereoscopic information (distance, shape) can be enjoyed; but, if it is not necessary, the apparatus may be constructed in a single-eye structure, whereby the weight, the size, and the cost can be reduced.

Among the HMD (Head Mounted Display) type display apparatus as described above, there are those of a type in which the displaying portions are made from a transparent (optically see-through) member whereby the operator can see a scene in the external field therethrough in a normal state, and with necessity, display contents of liquid crystal or the like are indicated on an optical surface in front of the operator (apparatus of a so-called head up display type). In the case of using such apparatus, a mark can be displayed over a portion of facsimile actually seen through the displaying apparatus for example, thereby clearly showing the object to be instructed.

As for the virtual switch panel or the icons displayed as virtual indications using the displaying portions, various changes can be made according to applications with regard to displaying positions, displaying timing, erasing timing, color, shape, and generation of sound.

As the object for detection of operation (specified object), any other object can be used than the fingers or the visual axes as in the above examples. For example, an object with a feature (a specific form or color, a pen having a temperature, or the like) may be used to facilitate recognition. Further, without recognition as a specified object, the apparatus may be arranged to judge an object detected in a specified area of screen, at a specified time, and in a specified application as an object for instruction (instructing object). In this case, the recognition processing is simplified. Also, once the instructing object or specified object is detected, the apparatus may be arranged to follow it. This arrangement realizes high-speed processing because it does not have to continuously perform the object recognition.

The operated object was facsimile or telephone in the above embodiments, but the invention is not limited to these; for example, the invention can be applied to air conditioners, interphones, illuminations, and a variety of devices used inside or outside by preliminarily registering them in the main body as to be recognized. The icons displayed on a virtual basis are not limited to icons preliminarily registered in the main body as in ordinary computers, but an object actually imaged through a camera can be displayed as it is. For example, if a facsimile device is set in a room and the operator turns the eyes toward it, the camera portions take an image of facsimile, so that the facsimile is displayed on the displaying portions. Then the apparatus may be arranged to perform processing related to the facsimile by the operator's pointing it out similarly as the icon. On this occasion, the color of the image of facsimile thus recognized may be arranged to be changed in order to indicate that the facsimile is recognized.

The above embodiments were so arranged that detection of operation instruction was done by detecting the operator's operation, for example moving a finger with respect to an object of an image displayed by the displaying portions, but a mechanical switch may also be used. Especially, use of mechanical switch is preferable for initial input of power supply to the main body or for initialization.

Further, the above-described embodiments were so arranged that the power supply to the main body was interrupted if no input was given over a predetermined time, but in this case, the power source does not have to be interrupted to all portions of the main body. The power supply may be partly controlled, for example such that the power supply is interrupted only to the camera portions or only to the displaying portions. Particularly, if there are a plurality of camera portions set, it is conceivable that only one of them is always driven and with detection of a specific instruction of operator through the camera, the power supply is started to the other camera portions with necessity. In another case, the power dissipation may be substantially decreased, without completely interrupting the power supply, by lowering an internal execution speed of CPU etc.

What is claimed is:

1. A display apparatus comprising:
    displaying means mounted on the head of an observer, for displaying image information for an observer;
    image pick-up means, mounted on the observer, for picking up an image of a field surrounding said observer;
    detecting means for detecting a predetermined motion of the body of said observer from an image signal output from said image pick-up means; and
    controlling means for making said displaying means display a display element for input of an operation instruction, and starting a process corresponding to said display element when said detecting means the predetermined motion in correspondence to said display element.

2. The apparatus according to claim 1, wherein said detecting means further includes visual axis detecting means for detecting a visual axis of the observer.

3. The apparatus according to claim 2, wherein said controlling means has means for comparing a direction corresponding to said display element with a direction of the visual axis detected by said visual axis detecting means.

4. The apparatus according to claim 1, wherein said controlling means has means for displaying a display element moving in accordance with the motion detected by said detecting means, on said displaying means.

5. The apparatus according to claim 4, wherein said controlling means has means for changing a display property of said display element moving in accordance with the motion detected by said detecting means.

6. The apparatus according to claim 1, further comprising sound generating means for generating a sound, wherein said controlling means makes said sound generating means function when said detecting means detects the specified motion.

7. The apparatus according to claim 1, wherein said detecting means comprises image taking means for taking in an image of at least a part of the body of said observer, and means for detecting a motion of the at least part of the body of said observer from an image signal from said image taking means.

8. The apparatus according to claim 7, wherein said image taking means has a plurality of image taking means with parallax.

9. The apparatus according to claim 8, wherein, if said detecting means do not detect motion of at least one portion of the body of said observer for a predetermined time or more, then power is interrupted to one of said plurality of image taking means.

10. The apparatus according to claim 9, wherein, if one of said plurality of image taking means other than the one of said plurality of image taking means to which the power was interrupted, detects said motion, then power is restored to the one of said plurality of image taking means to which power had been interrupted.

11. The apparatus according to claim 7, wherein said detecting means has means for detecting a hand or a finger of said observer within a spatial range preliminarily determined.

12. The apparatus according to claim 7, wherein said controlling means comprises means for preliminarily storing features of an object, and means for comparing said image signal with the features stored.

13. The apparatus according to claim 1, comprising communicating means for transmitting a signal to a device installed outside the apparatus, wherein said controlling means makes said displaying means display a display element corresponding to said device, and transmits a predetermined signal through said communicating means to said device when said detecting means detects the specified motion in correspondence to said device.

14. A display apparatus comprising:
    displaying means for displaying a symbol corresponding to a function;

image pick-up means, mounted on an observer, for picking up an image of a field of view of an observer;

detecting means for detecting a motion of the observer from an image signal output from said image pick-up means;

recognizing means for recognizing a specific motion of the observer relative to the symbol; and controlling means for executing a predetermined process corresponding to the function in the case that said recognizing means recognizes the specific motion.

15. The apparatus according to claim 14, wherein said displaying means is a head-mounted display device.

16. The apparatus according to claim 14, wherein said recognizing means recognizes the specific motion of a hand or a finger of the observer.

17. The apparatus according to claim 14, wherein said displaying means superimposes the image signal output from said image pick-up means over an image screen on which the symbol is displayed.

* * * * *

UNITED STATES PATENT AND TRADEMARK OFFICE
CERTIFICATE OF CORRECTION

PATENT NO. : 6,346,929 B1
DATED : February 12, 2002
INVENTOR(S) : Nobuo Fukushima et al.

It is certified that error appears in the above-identified patent and that said Letters Patent is hereby corrected as shown below:

Title page,
Item [*] Notice, the following should be inserted:

-- This patent issued on a continued prosecution application filed under 37 CFR 1.53(d), and is subject to the twenty year patent term provisions of 35 U.S.C. 154 (a)(2). --

Column 13,
Line 60, "for an observer;" should read -- for the observer; --

Column 14,
Line 4, "means the" should read -- means detects the --

Signed and Sealed this

Twenty-second Day of October, 2002

Attest:

Attesting Officer

JAMES E. ROGAN
Director of the United States Patent and Trademark Office